(12) United States Patent
Berthet

(10) Patent No.: US 8,123,598 B2
(45) Date of Patent: Feb. 28, 2012

(54) SEPARATOR DEVICE AND CLEANING SYSTEM FOR A STREAM HARVESTED BY A FRUIT HARVESTING MACHINE

(75) Inventor: Jean-Paul Berthet, La Chaize-Giraud (FR)

(73) Assignee: CNH America LLC, New Holland, PA (US)

( * ) Notice: Subject to any disclaimer, the term of this patent is extended or adjusted under 35 U.S.C. 154(b) by 183 days.

(21) Appl. No.: 12/452,974

(22) PCT Filed: Jul. 25, 2008

(86) PCT No.: PCT/EP2008/059791
§ 371 (c)(1),
(2), (4) Date: Jan. 29, 2010

(87) PCT Pub. No.: WO2009/016115
PCT Pub. Date: Feb. 5, 2009

(65) Prior Publication Data
US 2010/0132326 A1    Jun. 3, 2010

(30) Foreign Application Priority Data

Jul. 31, 2007   (FR) ..................................... 07 05598

(51) Int. Cl.
*A01D 17/00* (2006.01)

(52) U.S. Cl. ...................................................... 460/144

(58) Field of Classification Search .................. 460/144, 460/125, 114, 133, 148; 56/328.1, 327.1, 56/330, 16.5; 171/124, 28, 14, 129; 209/667, 209/629, 685; 198/834
See application file for complete search history.

(56) References Cited

U.S. PATENT DOCUMENTS 4,234,045 A * 11/1980 Porter .............................. 171/14
(Continued)

FOREIGN PATENT DOCUMENTS
EP            109324 A1 *  5/1984
(Continued)

*Primary Examiner* — Arpad Fabian-Kovacs
(74) *Attorney, Agent, or Firm* — Michael G. Harms

(57) ABSTRACT

A device for separating a harvested crop stream, the device being mounted in a fruit harvesting machine. The separator device includes longitudinal separator members (2) and a conveyor belt (3), which is driven in a longitudinal direction between an upstream roller (4) and a downstream roller (5). The separator members (2) are fastened, behind the upstream roller (4), by fixing the members to the frame (1) and, in front of the upstream roller, by a rotary member (12) mounted on the frame (1). The rotary member includes paddles (13), which are adapted to hold the separator members (2) in position during rotation of the member. The invention also relates to a cleaning system including this kind of separator device and a harvesting machine including this kind of cleaning system.

20 Claims, 3 Drawing Sheets

U.S. PATENT DOCUMENTS

| | | | | |
|---|---|---|---|---|
| 4,364,222 A * | 12/1982 | Ramacher | .................... | 56/328.1 |
| 4,385,702 A * | 5/1983 | Lenker et al. | ................. | 209/629 |
| 4,524,572 A * | 6/1985 | Wilde et al. | .................. | 56/327.1 |
| 4,884,393 A * | 12/1989 | Hilleby | ........................ | 56/327.1 |
| 5,042,240 A * | 8/1991 | Rocca et al. | ................... | 56/16.6 |
| 5,480,353 A * | 1/1996 | Garza, Jr. | ...................... | 460/148 |
| 5,846,129 A * | 12/1998 | Dragt | ........................... | 460/144 |
| 7,275,359 B2 * | 10/2007 | Merant et al. | ................ | 56/328.1 |
| 7,322,424 B2 * | 1/2008 | Kido | ............................... | 171/17 |
| 7,412,817 B2 * | 8/2008 | Flora et al. | .................. | 56/328.1 |
| 7,921,628 B2 * | 4/2011 | Meester | ....................... | 56/327.1 |
| 2008/0236126 A1 * | 10/2008 | Leonini | .......................... | 56/330 |
| 2009/0056297 A1 * | 3/2009 | Pellenc et al. | .................. | 56/330 |

FOREIGN PATENT DOCUMENTS

| | | | |
|---|---|---|---|
| EP | 1192850 A1 * | 4/2002 | |
| EP | 1336333 A1 * | 8/2003 | |
| FR | 2795599 A1 * | 1/2001 | |
| FR | 2859074 A1 * | 3/2005 | |

* cited by examiner

SEPARATOR DEVICE AND CLEANING SYSTEM FOR A STREAM HARVESTED BY A FRUIT HARVESTING MACHINE

BACKGROUND OF THE INVENTION

The invention relates to a device for separating a harvested stream, a cleaning system including such a separation device, and a harvesting machine including such a cleaning system.

The invention applies to the field of mechanised harvesting of fruit growing on trees or bushes, such as grapes, berries, coffee berries, olives and other fruit, in particular growing in bunches.

The fruit is conventionally harvested by a shaker system that straddles a row of plants to detach the harvest. The harvested crop stream obtained is then conveyed into the machine to be stored in at least one hopper provided for this purpose or in a trailer driven by.

However, because of the action of the shaker system, the harvested crop stream includes, in addition to detached fruit, and among other things, juice, leaves, wood particles, bunches of fruit of various sizes. To eliminate components other than fruit, in particular leaves and wood particles, harvesting machines include a cleaning system which is adapted to eliminate said components from the stream by suction before storage.

In particular, an aspiration or suction device can be disposed above the conveyor transporting the harvested stream from the shaker system to the storage facility. However, the problem then arises of adjusting the suction force to remove from the stream as many components without fruit as possible, and to do this without eliminating the harvested fruit and juice.

To solve this problem it has been proposed to equip these machines with a device for separating the harvested stream into two layers, respectively a top layer containing components of greater size, especially components other than fruit, and a bottom layer containing detached pieces of fruit and juice. Accordingly, as the suction device faces the top layer, the probability of sucking up components from the bottom layer is reduced.

Patent applications EP-1 192 850 and EP-1 336 333 propose to effect this separation by means of a conveyor equipped with elongate members that are fixed at the upstream end with an intermediate spacing allowing components of the bottom layer to pass between them. Accordingly, separation is effected by feeding the harvested stream upstream of said elongate members, then displacing said stream along the members over a sufficient length to complete said separation, and then ejecting the top and bottom layers in the downstream portion above which the suction device is placed.

In this arrangement the separation members on the machine are subjected to mechanical loads during harvesting, especially vibratory loads. Accordingly, the downstream ends of the members being free, the problem arises of holding said members in position to maintain a spacing between them that is adapted to retain the components of the top layer.

This problem is all the more critical in the case of a small harvesting machine in which the space available prevents the incorporation of a separator device, said device being fed by two conveyors coming from the shaker system. To complete separation, it is then necessary to use longer members, which increases the risk of relative displacement thereof.

The invention aims to improve on the prior art by in particular proposing a separator device including lengthwise separator members that are fixed to guarantee that their spacing is maintained under mechanical loads, this being achieved without forming any obstacle to the harvested stream transported by said device.

SUMMARY OF THE INVENTION

To this end, a first aspect of the invention proposes a device for separating a harvested stream, said device being intended to be mounted in a fruit harvesting machine, said device including a frame and longitudinal separator members that are fastened longitudinally to said frame and spaced transversely from each other to form an array for separating the crop stream between a portion retained on said array and a portion passing through said array, said device further including a conveyor belt that is driven in a longitudinal direction between an upstream roller and a downstream roller fastened to said frame, said belt being disposed under the separator members to form between the belt and the members a space for receiving the portion passing through, said belt being provided with teeth having a base part that extends into the receiving space and a projecting part that extends above the separator members, passing through the spaces formed between said members, wherein the separator members are restrained relative to the frame, adjacent the upstream roller, by affixing said members to the frame and, ahead of said upstream roller, by a rotary member mounted on the frame, said member including paddles that are adapted to hold the separator members in position on rotation of said member.

A second aspect of the invention proposes a system for cleaning a harvested stream including a separator device of the above kind, said system further including a downstream suction device that is disposed over the separator device to suck up at least some of the retained stream portion.

A third aspect of the invention proposes a fruit harvesting machine including a motorised support structure and a harvesting system mounted on said structure, said harvesting system being adapted to detach the harvest, said machine further including a cleaning system of the above kind, said system being fed with a harvested stream coming from the harvesting system.

DESCRIPTION OF THE DRAWINGS

Other objects and advantages of the invention will become apparent in the course of the following description, which is given with reference to the appended figures, in which.

DESCRIPTION OF THE PREFERRED EMBODIMENT

In the context of this description, terms such as "front" and "back" are defined relative to the direction of transport of the crop on the conveyor belt.

The invention relates to a machine for harvesting fruit in bunches, in particular a harvester for mechanised harvesting of grapes, notably for subsequent vinification thereof. A harvester conventionally includes a motorised support structure that is equipped with a driver station and a harvesting system mounted on said structure.

The grape harvester is designed to straddle at least one row of vines in order, as it moves, to introduce the vine stems successively into the harvesting system that is adapted to detach the harvest. To this end, the harvesting system includes vine shakers, in particular a set of shakers provided on either side of the space into which the vine stems are introduced.

The harvester also comprises a system for continuous recovery of the detached harvest, which comprises, in addition to detached grapes, and among other things, juice, leaves, wood particles, bunches of various sizes. In one embodiment, the system comprises two bucket conveyors adapted to recover the detached harvest under the introduction space and to convey said harvest into the upper portion of the harvester.

In the context of the vinification of grapes, it is desirable to eliminate components other than fruit beforehand, in particular as soon as harvested. Furthermore, it can be desirable to destem (debunch) harvested grapes to eliminate stalks and therefore to store only grapes and juice.

The harvester comprises a system for cleaning the harvested stream fed by the bucket conveyors to eliminate components other than fruit, especially leaves and wood particles. In particular, a small harvester can carry a single cleaning system that is fed with harvested streams by two bucket conveyors. Alternatively, two cleaning systems can be installed on the harvester and fed by a respective bucket conveyor.

One embodiment of a system of the invention for cleaning the harvested stream is described hereinafter with reference to the figures, said system including a device for separating the harvested stream into two layers as a function of the size of the components of said stream.

Figure 1:
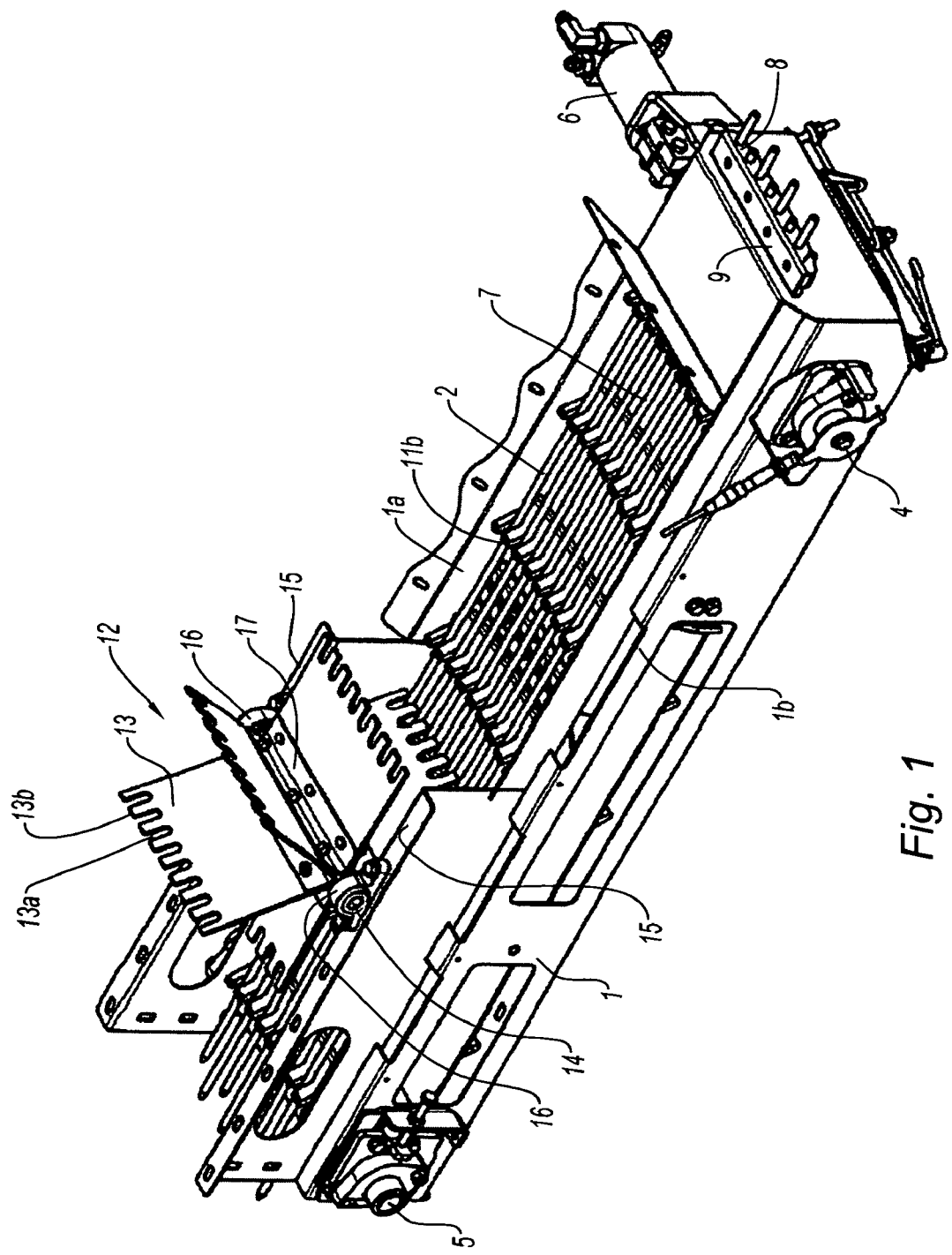
FIG. 1 is a perspective view of an embodiment of a separator device of the invention.

FIG. 1 shows the separator device, which includes a frame 1 intended to be attached to the harvester; in particular the frame 1 can be attached in an upwardly inclined configuration to enhance separation. The separator device also includes longitudinal separator members 2 onto which the harvested stream coming from the bucket conveyors is fed.

In the embodiment shown, the separator members 2 are formed of rods formed as a prism or a body of revolution, in particular a cylinder. Because the stream contacts the separator members 2, these are preferably made from a corrosion-resistant material, in particular a stainless metal or a synthetic material.

The separator device further includes a conveyor belt 3 (FIG. 3) that is driven in a longitudinal direction between an upstream roller 4 and a downstream roller 5 attached to the frame 1. In FIG. 1, the conveyor includes a motor 6 driving the upstream roller 4.

The separator members 2 are fastened longitudinally to the frame 1 and transversely spaced relative to each other to form an array 7 intended to separate the stream into a portion retained by said array and a portion passing through said array. In the embodiment shown, the members 2 are fixed by means of a fixture plate 8 surmounted by a clamping plate 9 to form cavities that receive the ends of respective members 2.

The lateral spacing between the separator members 2 is such that the retained portion includes leaves, wood particles and large bunches or parts of bunches, for example bunches of more than three berries. Consequently, the portion that passes through includes juice and quasi-detached berries, i.e. individual berries or small bunches of berries.

To define their lateral spacing, the separator members 2 are fixed to the frame 1 in the desired position. Furthermore, the fixing is effected beyond the upstream roller 4 so that the surface of the separator array 7 remains free for transporting the harvested crop stream. Furthermore, to enhance the resulting separation, the downstream, free ends of the rods 2 are alternately offset in the longitudinal direction.

The conveyor belt 3 is disposed under the separator members 2 providing a space 10 underneath them for receiving the portion passing through. To allow the portion passing through to be conveyed as far as the downstream roller 5, the belt is made from an impermeable material and is accommodated between two walls 1a, 1b of the frame 1 to form a sealed conveyor bed for that portion in the receiving space 10.

The belt 3 is also provided with teeth 11 having a base part 11a that extends into the receiving space 10 and a projecting part 11b that extends above the separator members 2, passing through the spaces between said members. In the embodiment shown, the belt 3 is provided with rows of teeth 11 that extend transversely the full width of the separator array 7, the teeth 11 of a row having a common base part 11a. Accordingly, by compartmentalising the space 10 for receiving the portion that passes through, each base part 11a improves the conveying of said portion to the downstream roller 5.

Moreover, the projecting parts 11b interact with the retained crop portion on the separator members 2 and convey it to the downstream roller 5, separation being accomplished while moving the retained portion over the separator array 7. Thus at the downstream roller 4, the layer that is retained on the array 7 primarily contains components larger than the spaces between the members 2 and the bottom layer contains the other components.

However, depending in particular on the volume of the stream to be separated, it may be necessary to provide longer separator members 2 in order to increase the separation distance over which the stream is moved. The length of the separator members 2 can typically exceed 1.2 meters.

To prevent relative dislocation of the separator members 2, in particular as a result of vibrations and the effects of the mechanical load caused by the harvest, said members are further restrained, ahead of the upstream roller 4, by a rotary member 12 mounted on the frame 1.

The member 12 includes paddles 13 which are adapted to be rotated by interaction with the projecting parts 11b of the teeth 11. The tips of the paddles 13 are engaged by the teeth 11. This interaction contributes to holding the separator members 2 in position because the paddles 13 then cyclically limit the possible movement of said members relative to the belt 3 and the frame 1. In a variant that is not shown, the rotary member 12 can be driven in rotation at the same peripheral speed as the belt 3, the paddles 13 then no longer needing to interact with the teeth 11 to cause rotation of the member 12.

In combination with the teeth 11, which provide downward retention of the separator members 2, the paddles 13 provide upward retention, with no risk of jamming since the superior part of the separator array 7 offers no obstacles to the movement of the retained stream portion.

In the embodiment shown, the rotary member 12 includes a shaft 14 each end of which is mounted on an upper bearing wall 15 of the frame 1 through a respective bearing 16, said shaft being freely rotatable. Each paddle 13 is formed by a flap, for example of semi-rigid impermeable material, that is associated radially with the shaft 14, for example by bolting it to a corresponding support surface 17 formed on the shaft 14.

The ends of the paddles 13 are provided with an alternating succession of notches 13a and tabs 13b, produced by cutting the flap, for example. The succession is such that the notches 13a can embrace a respective separator member 2 and the tabs 13b can be disposed in a respective space formed between said members. The rotation of the member 12 is therefore caused by the projecting parts 11b engaging the tabs 13b and, during rotation, the notches 13a embrace the separator members 2 to hold them in position. In the embodiment shown, the numbers of tabs 13b and projecting parts 11b are exactly the same so that they can be disposed facing each other.

Furthermore, the angular distance between the paddles 13 is such that the length of the arc between two adjacent paddles is equal to the distance between two adjacent rows of teeth 11. In this embodiment, each row of teeth 11 therefore successively engages a paddle 13. Moreover, to improve this engaging effect, the projecting parts 11b are inclined to have an angle of attack on the tabs 13b that is oriented toward the paddles 13.

Figure 2:
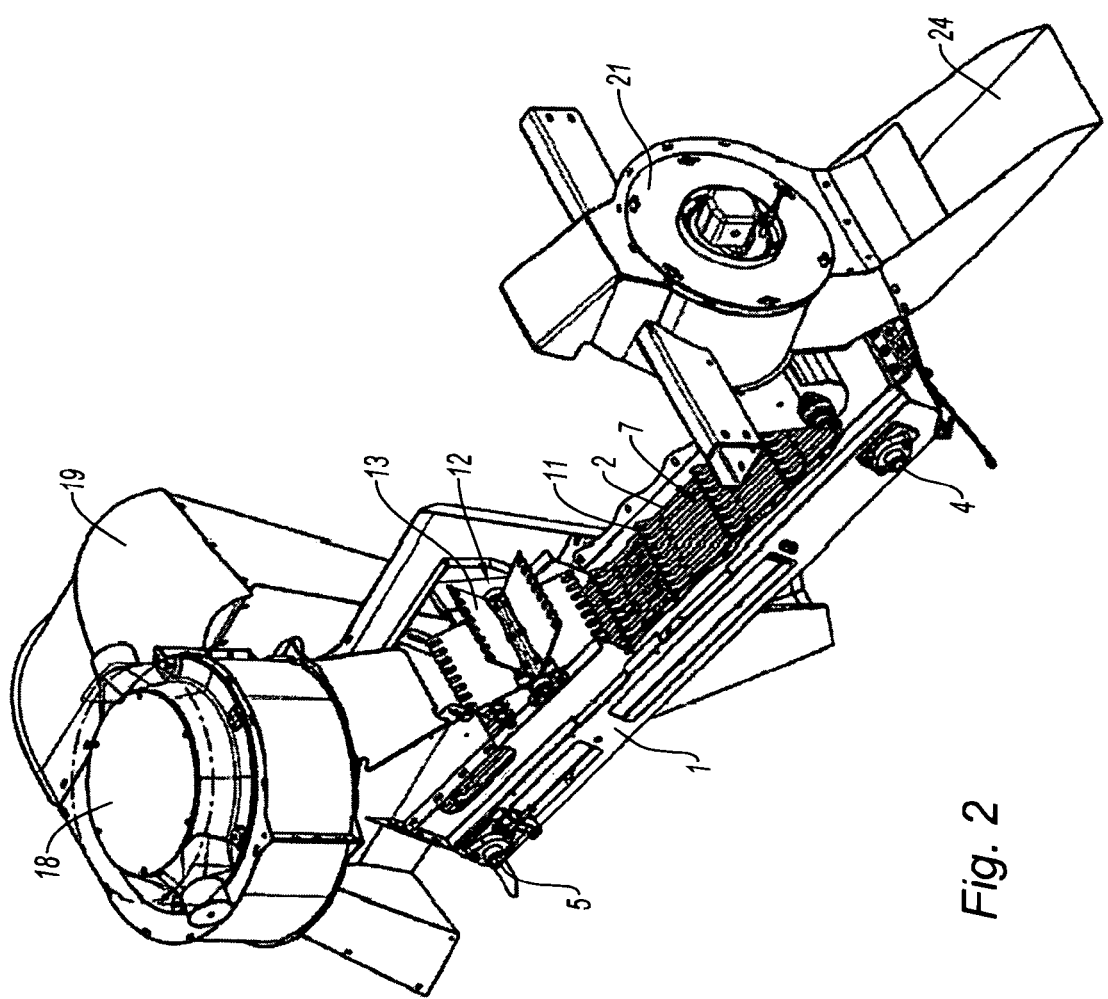
FIG. 2 is a perspective view of a cleaning system including the separator device shown in FIG. 1.
Figure 3A:
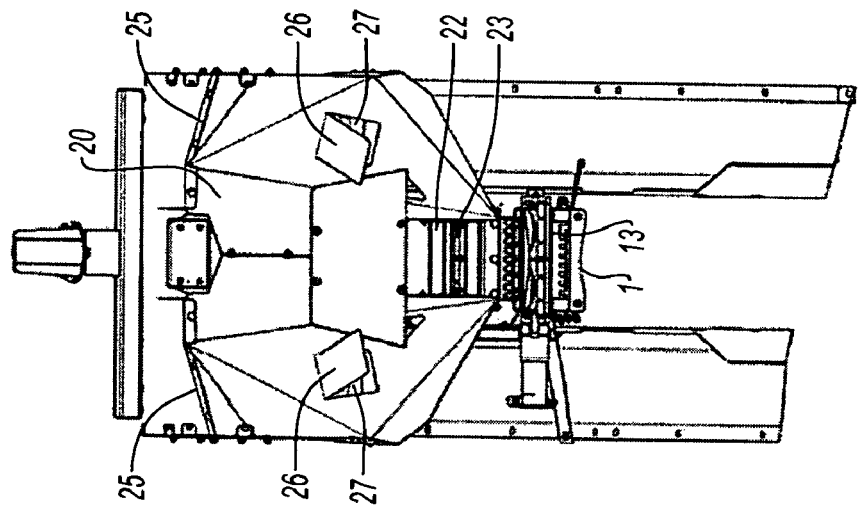
FIG. 3a is a view in section taken along the line B-B in FIG. 3.
Figure 3:
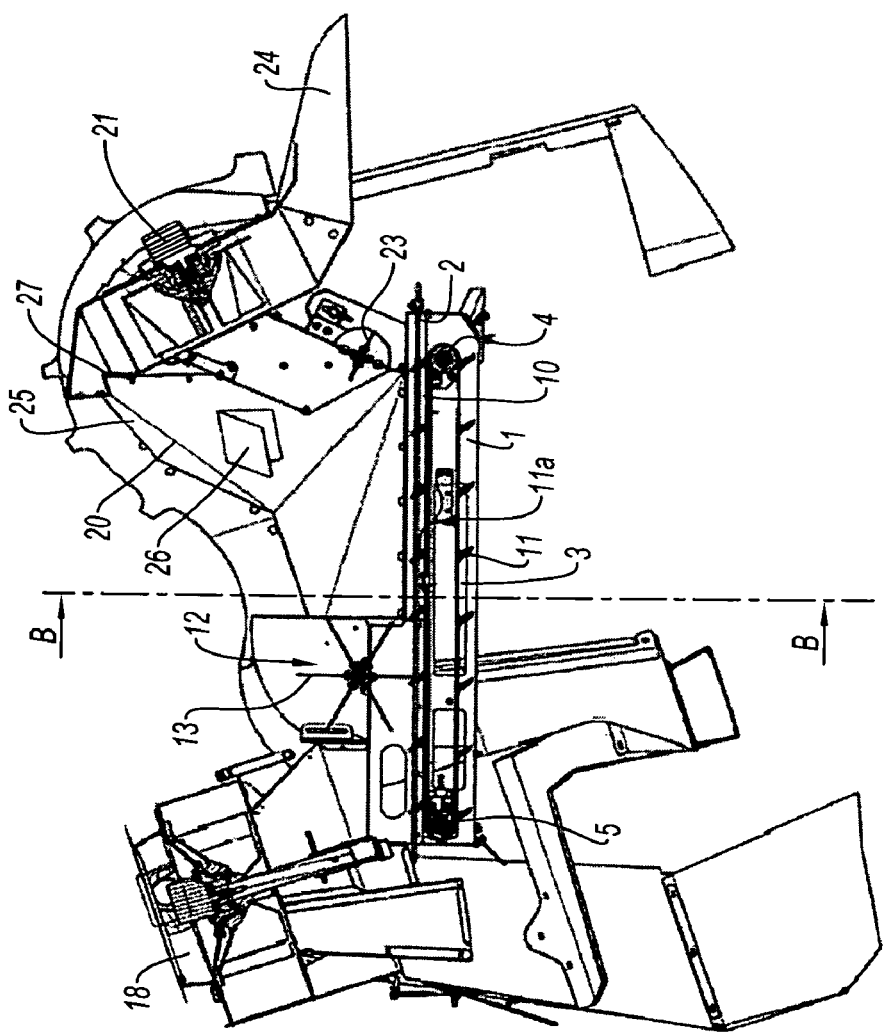
FIG. 3 is a view in longitudinal section of a cleaning system that is a variant of that shown in FIG. 2.

There is described hereinafter with reference to FIGS. 2 and 3 a cleaning system further including a downstream suction device 18 that is disposed over the separator device to suck up at least some of the retained stream portion.

The suction device 18 is provided particularly to suck up leaves and wood particles, but not grape bunches, the components sucked up being thereafter ejected through a lateral chute 19 provided for this purpose. Furthermore, because of the preceding separation, leaves sucked up have not been greatly wetted by juice, which greatly reduces their weight and thereby facilitates sucking them up. Thus apart from the fact that they are under the aspirated portion, the probability of sucking up juice and grapes can be reduced by limiting the suction force necessary for cleaning.

In the embodiment shown, the downstream suction device 18 is behind the rotary member 13 and in the vicinity of the downstream roller 5, to suck up the retained portion at the end of separation. Furthermore, the separator device can be adapted to suck up the retained portion just behind the downstream roller 5, for example where said portion is projected from the separator device.

The hopper 20 for feeding the separator device with the harvested stream is described with reference to FIGS. 3 and 3a, said hopper being associated with the frame 1 in the vicinity of the upstream roller 4 to cause the crop stream to drop from the bucket conveyors onto the separator members 2. The hopper 20 is made from bent sheet metal to have an appropriate three-dimensional geometry, in particular to have lower edges that are associated with corresponding mounting surfaces of the frame 1.

In this embodiment, the cleaning system includes a further, upstream suction device 21 adapted to suck up a portion of the stream fed by the hopper 20. Thus, during feeding, some of the undesirable components can already be eliminated so as not to overload the separator array 7 and thereby to increase cleaning efficiency accordingly.

To this end, the hopper 20 has a front opening 22 at the bottom in which the suction intake of the upstream device 21 is disposed, said opening being equipped with a shredder 23 to facilitate aspiration and ejection via a rear chute 24 provided for this purpose.

In the embodiment shown, the hopper 20 includes two upper areas 25 onto which respective bucket conveyors tip the harvested stream, each area 25 being formed on either side of the separator array 7. The wall vertically in line with said areas is equipped with a ramp 26 formed by cutting out and raising a portion of said wall.

In this embodiment, each of the crop streams descending from the tipping area 25 is raised by a ramp 26, which produces a wave effect when the streams meet up on the separator array 7. This hence raises the lighter components, in particular leaves and wood particles, which facilitates their aspiration by the upstream device 21. Moreover, the cutouts 27 formed under the ramp 26 enable circulation of air in the hopper 20, which is beneficial to the operation of the upstream suction device 21.

The harvesting machine equipped with the cleaning system described above has the advantage of delivering a very clean harvest, which can be stored directly in a hopper provided below the area of ejection of the crop stream portions. In this embodiment, the portion of the stream that passes through and the portion of the stream that is retained after aspiration are therefore tipped directly into the hopper.

In another embodiment, the harvesting machine can be equipped with a destemming system that separates berries from stalks, to store only separated berries and juice. The destemming system can be implemented in accordance with the document EP-1 002 467.

The invention also provides for the destemming system to include a separator device as described hereinabove. By adjusting the spacing between the separator members, the device can separate individual berries. Furthermore, separation can be encouraged by shaking the frame 1 or by the action of a motorised member such as the rake described in the document referred to above.

A variant of the destemming system can be fed only with the stream portion retained after aspiration, with the portion that passes through the separator member array being stored directly, because it includes only quasi-detached berries and juice. To this end, a conveyor can be provided under the ejection area for the portion of the stream that passes through, to direct it into the storage hopper.

In another variant, the two stream portions can be mixed on leaving the cleaning system to feed the destemming system with the whole of the cleaned harvested stream.

The invention claimed is:

1. A device for separating a harvested crop stream, said device being intended to be mounted in a fruit harvesting machine, said device comprising:
   a frame (1) and longitudinal separator members (2) that are fastened longitudinally to said frame and spaced transversely from each other to form an array (7) for separating the crop stream between a portion retained on said array and a portion passing through said array; and
   a conveyor belt (3) that is driven in a longitudinal direction between an upstream roller (4) and a downstream roller (5) fastened to said frame, said belt being disposed under the separator members (2) to provide between the belt and the separator members a space (10) for receiving the portion passing through, said belt being provided with teeth (11) having a base part (11a) that extends into the receiving space (10) and a projecting part (11b) that extends above the separator members (2), passing through the spaces formed between said separator members, wherein the separator members (2) are restrained relative to the frame (1), adjacent the upstream roller (4), by affixing said separator members to the frame (1) and, ahead of said upstream roller, by a rotary member (12) mounted on the frame (1), said rotary member including paddles (13) that are adapted to hold the separator (2) members in position on rotation of said rotary member.

2. A separator device according to claim 1, wherein the paddles (13) are driven in rotation by interaction with the projecting parts (11b) of the teeth (11).

3. A separator device according to claim 1, wherein the end of the paddles (13) is provided with an alternating succession of notches (13a) and tabs (13b), said succession being such that the notches (13a) can embrace a respective separator member (2) and the tabs (13b) can be disposed in a respective space between said rotary members.

4. A separator device according to claim 3, wherein the rotary member (12) includes a shaft (14) each end of which is mounted on the frame (1) by means of a respective bearing (16), each paddle (13) being formed of a flap radially associated with the roller (14).

5. A separator device according to claim 1, wherein the belt (3) is provided with rows of teeth (11) that extend transversely over the full width of the separator array (7).

6. A separator device according to claim 5, wherein the angular offset between the paddles (13) is such that the length of the arc formed between two adjacent paddles is equal to the distance between two adjacent rows of teeth (11).

7. A separator device according to claim 5, wherein the teeth (11) of a row have a common base part (11a) compartmentalizing the space (10) for receiving the crop portion passing through.

8. A separator device according to claim 1, wherein the projecting parts (11b) have an angle of attack oriented toward the paddles (13).

9. A separator device according to claim 1, wherein the separator members (2) are formed of rods having a circular section.

10. A separator device according to claim 9, wherein the ends of the rods adjacent the downstream roller (5) are alternately offset longitudinally.

11. A separator device according to claim 1, wherein the space (10) for receiving the portion passing through is adapted to form a sealed conveyor bed as far as the downstream roller (5) of said portion.

12. A system for cleaning a harvested stream comprising:
a separator device including a frame (1) and longitudinal separator members (2) that are fastened longitudinally to said frame and spaced transversely from each other to form an array (7) for separating the crop stream between a portion retained on said array and a portion passing through said array;
a conveyor belt (3) that is driven in a longitudinal direction between an upstream roller (4) and a downstream roller (5) fastened to said frame, said belt being disposed under the separator members (2) to provide between the belt and the separator members a space (10) for receiving the portion passing through, said belt being provided with teeth (11) having a base part (11a) that extends into the receiving space (10) and a projecting part (11b) that extends above the separator members (2), passing through the spaces formed between said separator members, wherein the separator members (2) are restrained relative to the frame (1), adjacent the upstream roller (4), by affixing said separator members to the frame (1) and, ahead of said upstream roller, by a rotary member (12) mounted on the frame (1), said rotary member including paddles (13) that are adapted to hold the separator (2) members in position on rotation of said rotary member; and
a downstream suction device (18) disposed over the separator device for sucking up at least some of the retained crop stream portion.

13. A cleaning system according to claim 12, further including a hopper (20) for feeding the harvested crop stream to the separator device.

14. A cleaning system according to claim 13, further including an upstream suction device (21) adapted to aspirate part of the crop stream fed by the hopper (20).

15. A cleaning system according to claim 14, wherein the upstream suction device (21) is provided behind the rotary member (12).

16. A cleaning system according to claim 13, wherein the hopper (20) includes at least one front opening (22) in which the suction intake of the upstream suction device (21) is disposed, said opening being equipped with a shredder (23).

17. A cleaning system according to claim 13, wherein the hopper (20) includes at least one upper crop tipping area (25), the wall below said area being provided with a ramp (26) formed by cutting and raising part of said wall.

18. A fruit harvesting machine comprising:
a motorized support structure and a harvesting system mounted on said motorized support structure, said harvesting system being adapted to detach the crop, said machine further including a cleaning system, said cleaning system being fed with a harvested stream coming from the harvesting system, wherein the cleaning system further includes a separator device including a frame (1) and longitudinal separator members (2) that are fastened longitudinally to said frame and spaced transversely from each other to form an array (7) for separating the crop stream between a portion retained on said array and a portion passing through said array;
a conveyor belt (3) that is driven in a longitudinal direction between an upstream roller (4) and a downstream roller (5) fastened to said frame, said belt being disposed under the separator members (2) to provide between the belt and the separator members a space (10) for receiving the portion passing through, said belt being provided with teeth (11) having a base part (11a) that extends into the receiving space (10) and a projecting part (11b) that extends above the separator members (2), passing through the spaces formed between said separator members, wherein the separator members (2) are restrained relative to the frame (1), adjacent the upstream roller (4), by affixing said separator members to the frame (1) and, ahead of said upstream roller, by a rotary member (12) mounted on the frame (1), said rotary member including paddles (13) that are adapted to hold the separator (2) members in position on rotation of said rotary member; and
a downstream suction device (18) disposed over the separator device for sucking up at least some of the retained crop stream portion.

19. A fruit harvesting machine according to claim 18, further including a hopper into which the crop stream portion passing through and the stream portion retained after aspiration are tipped.

20. A fruit harvesting machine according to claim 18, further including a destemming system fed with at least the stream portion retained after aspiration.

* * * * *